US012672188B2

(12) United States Patent
Lin

(10) Patent No.: US 12,672,188 B2
(45) Date of Patent: Jun. 30, 2026

(54) METHOD OF AVOIDING SURVIVAL TIME FAILURE AND RELATED DEVICES

(71) Applicant: Purplevine Innovation Company Limited, Hong Kong (CN)

(72) Inventor: Yi-Ting Lin, Hong Kong (CN)

(73) Assignee: Purplevine Innovation Company Limited, Hong Kong (CN)

( * ) Notice: Subject to any disclaimer, the term of this patent is extended or adjusted under 35 U.S.C. 154(b) by 522 days.

(21) Appl. No.: 17/924,376

(22) PCT Filed: Jul. 27, 2022

(86) PCT No.: PCT/CN2022/108317
§ 371 (c)(1),
(2) Date: Nov. 10, 2022

(87) PCT Pub. No.: WO2023/005985
PCT Pub. Date: Feb. 2, 2023

(65) Prior Publication Data
US 2024/0040651 A1 Feb. 1, 2024

Related U.S. Application Data

(60) Provisional application No. 63/225,970, filed on Jul. 27, 2021.

(51) Int. Cl.
*H04W 76/18* (2018.01)
*H04L 1/18* (2023.01)
(Continued)

(52) U.S. Cl.
CPC .............. *H04W 76/18* (2018.02); *H04L 1/18* (2013.01); *H04W 76/15* (2018.02); *H04W 76/27* (2018.02)

(58) Field of Classification Search
CPC ..... H04W 76/18; H04W 76/15; H04W 76/27; H04L 1/18
See application file for complete search history.

(56) References Cited

U.S. PATENT DOCUMENTS

2008/0031168 A1* 2/2008 Bucknell ............... H04L 1/1867
370/310
2018/0310202 A1* 10/2018 Löhr ..................... H04W 76/27
(Continued)

FOREIGN PATENT DOCUMENTS

| CN | 111512596 | 8/2020 |
| CN | 112448795 | 3/2021 |
| WO | WO 2021/002873 | 1/2021 |

OTHER PUBLICATIONS

International Search Report and the Written Opinion Dated Sep. 28, 2022 From the International Searching Authority Re. Application No. PCT/CN2022/108317. (8 Pages).
(Continued)

*Primary Examiner* — Michael Thier
*Assistant Examiner* — Tracy Lauren Raimondo

(57) ABSTRACT

A method of avoiding survival time (ST) failure, a user equipment (UE) and a base station (BS) are provided. The method includes being configured with pre-allocated radio resource by a base station (BS); transmitting data on an uplink configured grant; and entering a survival state and activating Packet Data Convergence Protocol (PDCP) duplication on the pre-allocated radio resource to retransmit the data. By performing the PDCP duplication, the UE could recover the failed transmission within the requirement of ST and avoid the application shutdown.

18 Claims, 9 Drawing Sheets

(51) Int. Cl.
*H04W 76/15* (2018.01)
*H04W 76/27* (2018.01)

(56) References Cited

U.S. PATENT DOCUMENTS

| | | | |
|---|---|---|---|
| 2019/0254117 A1* | 8/2019 | Chen | H04L 47/34 |
| 2019/0342911 A1 | 11/2019 | Talarico et al. | |
| 2020/0221310 A1* | 7/2020 | Babaei | H04L 1/1671 |
| 2020/0274654 A1* | 8/2020 | Loehr | H04W 72/23 |
| 2020/0344838 A1 | 10/2020 | Wu et al. | |
| 2021/0377793 A1* | 12/2021 | Moilanen | H04L 43/0847 |
| 2022/0225351 A1* | 7/2022 | Liu | H04L 1/08 |
| 2022/0263743 A1 | 8/2022 | Gebert et al. | |
| 2023/0309180 A1* | 9/2023 | Tesanovic | H04W 76/25 |
| 2023/0413151 A1* | 12/2023 | Tan | H04L 5/0053 |
| 2023/0422084 A1* | 12/2023 | Chen | H04W 28/0252 |
| 2024/0049331 A1* | 2/2024 | Jiang | H04L 1/1896 |

OTHER PUBLICATIONS

CATT, "Enhancement of Resource Efficiency for PDCP Duplication", CATT, 3GPP TSG-RAN2, Meeting #106, Reno, USA, May 13-17, 2019, R2-1905751, 3 P., May 17, 2019.

CATT, "Survival Time Triggered PDCP Duplication", CATT, 3GPP TSG-RAN WG2 Meeting #106, Reno, USA, May 13-17, 2019, R2-1905752, 4 P., May 17, 2019.

Ericsson, "RAN Enhancements Based on New QoS Related Parameters", Ericsson, 3GPP TSG-RAN WG2 #114e, Tdoc R2-2105676, ElectronicMeeting, May 19-27, 2021, Sections 1-2, 4 P., May 27, 2021.

* cited by examiner

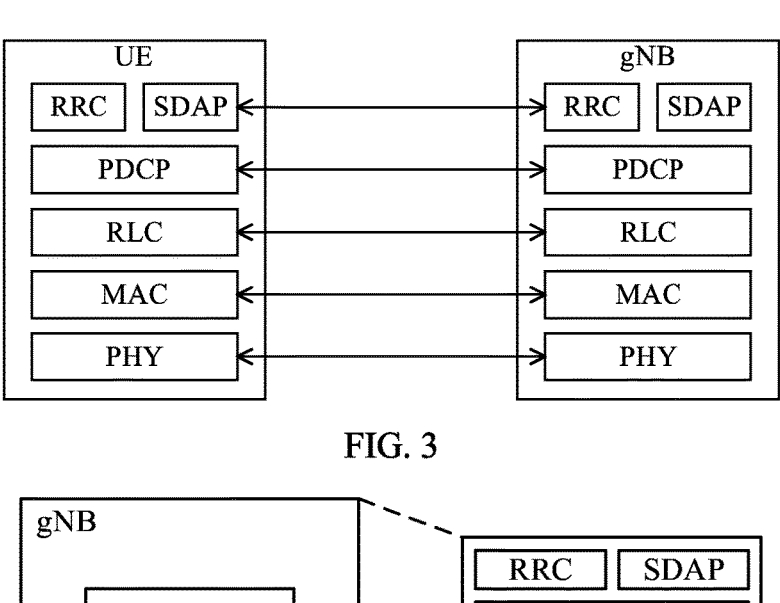
FIG. 3
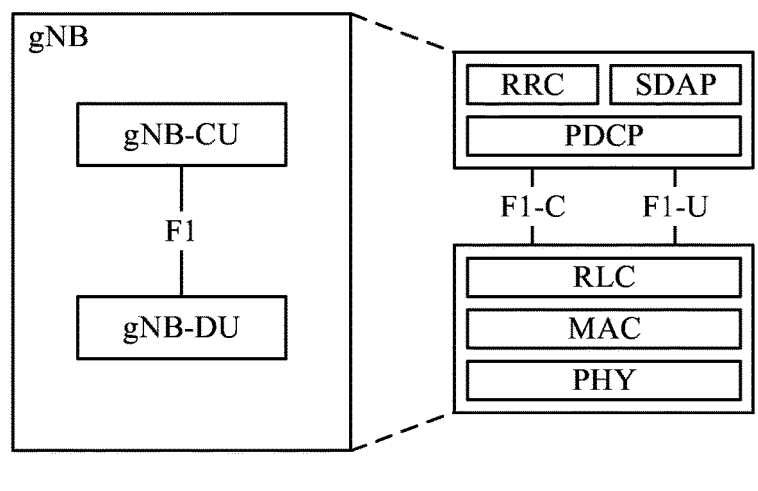
FIG. 4
500 ⌐↘
502 ⌐↘ being configured with pre-allocated radio resource by a base station
504 ⌐↘ transmitting data on an uplink configured grant
506 ⌐↘ entering a survival state and activating Packet Data Convergence Protocol (PDCP) duplication on the pre-allocated radio resource to retransmit the data
FIG. 5

METHOD OF AVOIDING SURVIVAL TIME FAILURE AND RELATED DEVICES

RELATED APPLICATIONS

This application is a National Phase of PCT Patent Application No. PCT/CN2022/108317 having International filing date of Jul. 27, 2022, which claims the benefit of priority under 35 USC § 119(e) of U.S. Provisional Patent Application No. 63/225,970 filed on Jul. 27, 2021. The contents of the above applications are all incorporated by reference as if fully set forth herein in their entirety.

FIELD AND BACKGROUND OF THE INVENTION

The present application relates to wireless communication, and more particularly, to a method of avoiding survival time (ST) failure, and related devices such as a user equipment (UE) and a base station (BS).

This background section introduces aspects that may facilitate a better understanding of the disclosure. Accordingly, the statements of this section are to be read in this light and are not to be understood as admissions about what is in the prior art or what is not in the prior art.

Communication systems and networks have developed towards being a broadband and mobile system. In cellular wireless communication systems developed by the Third Generation Partnership Project (3GPP), user equipment (UE) is connected by a wireless link to a radio access network (RAN). The RAN includes a set of base stations (BS s) which provide wireless links to the UEs located in cells covered by the base station, and an interface to a core network (CN) which provides overall network control. As will be appreciated the RAN and CN each conduct respective functions in relation to the overall network. The 3GPP has developed the so-called Long Term Evolution (LTE) system, namely, an Evolved Universal Mobile Telecommunication System Territorial Radio Access Network (E-UTRAN), for a mobile access network where one or more macro-cells are supported by a base station known as an eNodeB or eNB (evolved NodeB). More recently, evolved from LTE, the so-called 5G or New radio (NR) systems where one or more cells are supported by a base station known as a gNB.

The 5G NR standard supports a multitude of different services each with very different requirements. These services include Enhanced Mobile Broadband (eMBB) for high data rate transmission, Ultra-Reliable Low Latency Communication (URLLC) for devices requiring low latency and high link reliability and Massive Machine-Type Communication (mMTC) to support a large number of low-power devices for a long life-time requiring highly energy efficient communication.

The URLLC is a communication service for successfully delivering packets with stringent requirements, particularly in terms of availability, latency, and reliability. The URLLC enables supporting the emerging applications and services. Example services include wireless control and automation in industrial factory environments, inter-vehicular communications for improved safety and efficiency, and the tactile Internet. It is of importance for 5G especially considering the effective support of verticals which brings new business to the whole telecommunication industry.

A Work Item (WI) on Enhanced Industrial Internet of Things (IoT) and URLLC support for NR (NR_IIOT_URLLC_enh) was approved by the 3GPP. According to the objectives of the WID for 3GPP Release Version 17 (Rel-17) NR_IIOT_URLLC_enh work item, RAN enhancements based on new Quality of Service (QoS) parameters such as survival time (ST) or burst spread should be studied. The RAN enhancements may consider avoiding survival time failure by UE-based Packet Data Convergence Protocol (PDCP) duplication and/or returning to normal state after the packet(s) is successfully transmitted.

According to current 3GPP specification (TS 22.104), the survival time (ST) is defined as a pre-configured period before the target device considers the communication service and its associated application to be unavailable. If the survival time has been exceeded, both the communication service and the associated application will enter a down state, and the target device may restart the application and the Quality of Service (QoS) may be degraded.

The survival time is one of the QoS parameters of Time Sensitive Communication Assistance Information (TSCAI) which is received from Application Function (AF). The value of survival time for periodic communication has been defined in current 3GPP specification (TS 22.104), and only part of which are listed in the following Table 1. The top three rows of Table 1 are considered as the most stringent ST requirements. The survival time is 500 μs, 1 ms and 2 ms for the top three scenarios in Table 1, respectively.

TABLE 1

| Characteristic parameter | | | | | | | |
| --- | --- | --- | --- | --- | --- | --- | --- |
| | Communication | | | Influence quantity | | | |
| Communication service availability: target value | service reliability: mean time between failures | End-to-end latency: maximum | Message size [byte] | Transfer interval: target value | Survival time | # of UEs | Remarks |
| 99.999% to 99.999 99% | ~10 years | <transfer interval value | 50 | 500 μs | 500 μs | ≤20 | Motion control |
| 99.999 9% to 99.999 999% | ~10 years | <transfer interval value | 40 | 1 ms | 1 ms | ≤50 | Motion control |
| 99.999 9% to 99.999 999% | ~10 years | <transfer interval value | 20 | 2 ms | 2 ms | ≤100 | Motion control |
| . | . | . | . | . | . | . | . |
| . | . | . | . | . | . | . | . |
| . | . | . | . | . | . | . | . |

FIG. 1 shows that only one retransmission is allowed to recover the failure of configured grant 2 (CG2) when the value of ST is stringent as the top three rows of Table 1. In such a case, the UE must monitor the transmission failure and then trigger the retransmission as early as possible. Because the retransmission for CG2 may encounter failure again, normal retransmission mechanism such as Hybrid Automatic Repeat reQuest (HARQ) may be not enough to recover the failure and more reliable retransmission such as PDCP duplication may be required. In 3GPP Rel-16, Medium Access Control (MAC) Control Element (CE) based PDCP duplication activated by gNB is supported. However, the reliable retransmission after receiving the MAC CE to activate PDCP duplication may be too late to retransmit the CG2 within the survival time.

In short, the retransmission for a configured grant may encounter failure again, and the retransmission mechanism such as HARQ may not recover the failure. More reliable retransmission such as PDCP duplication may be required. However, triggering the retransmission after receiving a MAC CE for activating PDCP duplication may be too late to retransmit the failed configured grant within the survival time.

Therefore, there is an urgent need to develop a new approach to solve above problems to avoid survival time failure.

SUMMARY OF THE INVENTION

An objective of the present application is to provide a method of avoiding survival time failure, a user equipment (UE) and a base station (BS) for solving the problems in the existing arts.

In a first aspect, an embodiment of the present application provides a method of avoiding survival time (ST) failure, performed by a user equipment (UE) in a network, the method including: being configured with pre-allocated radio resource by a base station (BS); transmitting data on an uplink configured grant; and entering a survival state and activating Packet Data Convergence Protocol (PDCP) duplication on the pre-allocated radio resource to retransmit the data.

In a second aspect, an embodiment of the present application provides a method of avoiding survival time (ST) failure, performed by a base station (BS) in a network, the method including: configuring a user equipment (UE) with pre-allocated radio resource; receiving data on an uplink configured grant from the UE; and dedicating the pre-allocated radio resource to the UE for receiving retransmitted data from the pre-allocated radio resource for Packet Data Convergence Protocol (PDCP) duplication.

In a third aspect, an embodiment of the present application provides a UE, communicating with a BS in a network, the UE including a memory, configured to store program instructions; a transceiver, configured to transmit and receive data; and a processor, coupled to the memory and the transmitter, configured to call and run the program instructions stored in a memory, to cooperate with the memory to execute the method of the first aspect.

In a fourth aspect, an embodiment of the present application provides a BS, communicating with a UE in a network, the BS including a memory, configured to store program instructions; a transceiver, configured to transmit and receive data; and a processor, coupled to the memory and the transmitter, configured to call and run the program instructions stored in a memory, to cooperate with the memory to execute the method of the second aspect.

In a fifth aspect, an embodiment of the present application provides a computer readable storage medium provided for storing a computer program, which enables a computer to execute the method of any of the first and the second aspects.

In a sixth aspect, an embodiment of the present application provides a computer program product, which includes computer program instructions enabling a computer to execute the method of any of the first and the second aspects.

In a seventh aspect, an embodiment of the present application provides a computer program, when running on a computer, enabling the computer to execute the method of any of the first and the second aspects.

BRIEF DESCRIPTION OF THE SEVERAL VIEWS OF THE DRAWINGS

In order to more clearly illustrate the embodiments of the present application or related art, the following figures that will be described in the embodiments are briefly introduced. It is obvious that the drawings are merely some embodiments of the present application, a person having ordinary skill in this field can obtain other figures according to these figures without paying the premise.

FIG. 3 is a schematic diagram illustrating radio protocol architecture within gNB and UE.

FIG. 4 is a schematic diagram illustrating a gNB further including a centralized unit (CU) and a plurality of distributed unit (DUs).

FIG. 5 is a flowchart of a method of avoiding survival time (ST) failure according to an embodiment of the present application.

DESCRIPTION OF SPECIFIC EMBODIMENTS OF THE INVENTION

Embodiments of the disclosure are described in detail with the technical matters, structural features, achieved objects, and effects with reference to the accompanying drawings as follows. Specifically, the terminologies in the embodiments of the present application are merely for describing the purpose of the certain embodiment, but not to limit the disclosure.

The present invention provides a mechanism of PDCP duplication which is triggered by an earlier feedback from a base station (e.g., gNB). In some embodiments of the application, how to exit the PDCP duplication after the burst(s) is successfully transmitted is specified so as to avoid a waste of radio resources.

In this disclosure, at least the following aspects are discussed:

1. How to trigger a UE to enter a survival state. In some embodiments, the UE could enter the survival state based on the number of received HARQ NACK and/or based on a timer.
2. Radio resource allocation for UE-based PDCP duplication. In some embodiments, a type of configured grant is configured for the UE-based PDCP duplication. When a configured grant is configured for the UE-based PDCP duplication, the base station may allocate the configured grant for other UEs or for other logical channels of the UE when the configured grant is not activated.
3. How to stop a UE from performing PDCP duplication and exit the survival state. In some embodiments, the UE could exit the survival state based on the number of received HARQ ACK.
4. The detailed procedure for UE-based PDCP duplication. Some embodiments are provided for UE side and some other embodiments are provided for the base station side (e.g., gNB side).

Figure 2:
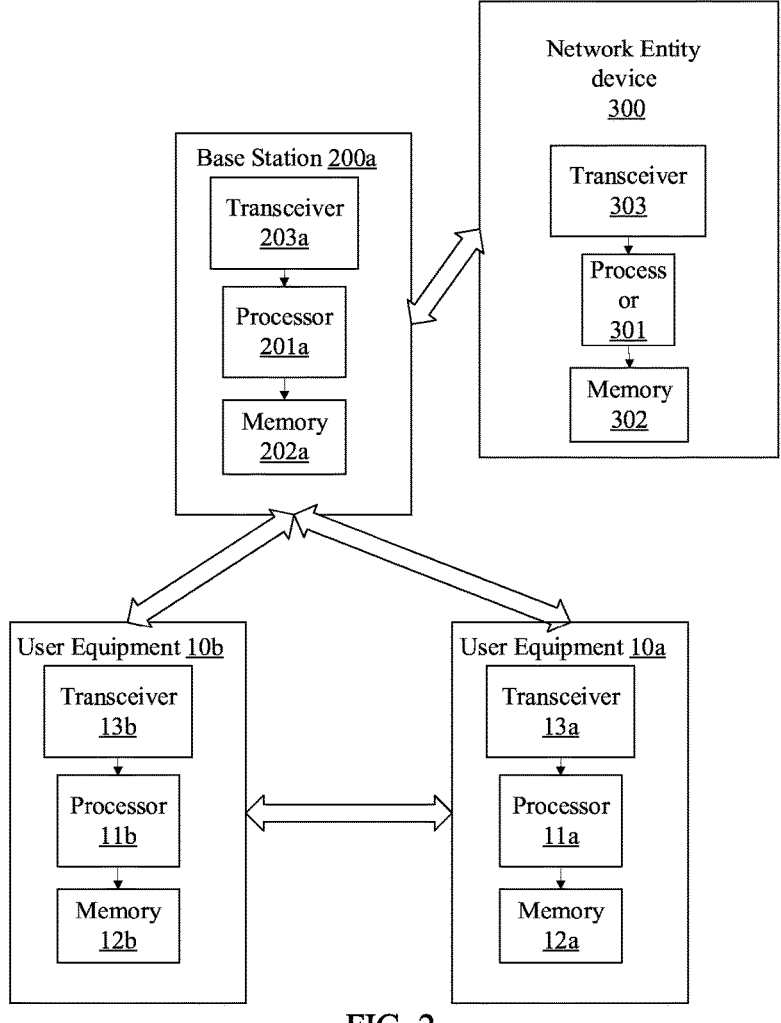
FIG. 2 is a block diagram illustrating one or more UEs, a base station and a network entity device in a communication network system according to an embodiment of the present application.

FIG. 2 illustrates that, in some embodiments, one or more user equipments (UEs) 10a, 10b, a base station (e.g., gNB or eNB) 200a and a network entity device 300 for wireless communication in a communication network system according to an embodiment of the present application are provided. With reference to FIG. 2, a UE a UE 10b, a base station 200a, and a network entity device 300 executes embodiments of the method according to the present application. Connections between devices and device components are shown as lines and arrows in the FIG. 2. The UE may include a processor 11a, a memory 12a, and a transceiver 13a. The UE 10b may include a processor 11b, a memory 12b, and a transceiver 13b. The base station 200a may include a processor 201a, a memory 202a, and a transceiver 203a. The network entity device 300 may include a processor 301, a memory 302, and a transceiver 303. Each of the processors 11a, 11b, 201a, and 301 may be configured to implement proposed functions, procedures and/or methods described in this description. Layers of radio interface protocols may be implemented in the processors 11a, 11b, 201a, and 301. Each of the memory 12a, 12b, 202a, and 302 operatively stores a variety of program and information to operate a connected processor. Each of the transceiver 13a, 13b, 203a, and 303 is operatively coupled with a connected processor, transmits and/or receives radio signals. The base station 200a may be an eNB, a gNB, or one of other radio nodes.

Each of the processor 11a, 11b, 201a, and 301 may include a general-purpose central processing unit (CPU), an application-specific integrated circuits (ASICs), other chipsets, logic circuits and/or data processing devices. Each of the memory 12a, 12b, 202a, and 302 may include a read-only memory (ROM), a random access memory (RAM), a flash memory, a memory card, a storage medium, other storage devices, and/or any combination of the memory and storage devices. Each of the transceiver 13a, 13b, 203a, and 303 may include baseband circuitry and radio frequency (RF) circuitry to process radio frequency signals. When the embodiments are implemented in software, the techniques described herein can be implemented with modules, procedures, functions, entities and so on, that perform the functions described herein. The modules can be stored in a memory and executed by the processors. The memory can be implemented within a processor or external to the processor, in which those can be communicatively coupled to the processor via various means are known in the art.

The network entity device 300 may be a node in a central network (CN). The CN may include LTE CN or 5G core (5GC) which may include user plane function (UPF), session management function (SMF), access and mobility management function (AMF), unified data management (UDM), policy control function (PCF), control plane (CP)/ user plane (UP) separation (CUPS), authentication server function (AUSF), network slice selection function (NSSF), the network exposure function (NEF), and other network entities.

The radio protocol architecture within the base station (gNB) and UE for SDT is shown in FIG. 3, which includes Radio Resource Control (RRC), Service Data Adaptation Protocol (SDAP), Packet Data Convergence Protocol (PDCP), Radio Link Control (RLC), Medium Access Control (MAC), and Physical Layer Protocol (PHY). In RAN functional split, the gNB further includes a centralized unit (CU) and a plurality of distributed unit (DUs) as shown in FIG. 4. The protocol stack of CU includes an RRC layer, an optional SDAP layer, and a PDCP layer, while the protocol stack of DU includes an RLC layer, a MAC layer, and a PHY layer. The F1 interface between the CU and DU is established between the PDCP layer of the protocol stack and the RLC layer of the protocol stack.

FIG. 5 is a flowchart of a method 500 of avoiding survival time (ST) failure according to an embodiment of the present application. Referring to FIG. 5 in conjunction with FIG. 2, the method 500 may include the followings. In block 502 of the method 500, the UE is configured by the base station with pre-allocated radio resource. The pre-allocated radio resource may be one or more RLC entities for Packet Data Convergence Protocol (PDCP) duplication (e.g., UE-based PDCP duplication). In block 504, the UE transmits data on an uplink configured grant. In this block, the data is uplink data to be transmitted to the base station. The UE may transmit the data on the configured grant for non-UE-based PDCP duplication. That is, the UE does not use the RLC entity for the PDCP duplication to transmit the data in this block. In block 506, the UE enters a survival state and activates the PDCP duplication on the pre-allocated radio resource to retransmit the data. In this block, if the data in block 504 is not successfully transmitted on the uplink configured grant, the data has to be retransmitted. In the process of retransmission of the data, the UE enters a survival state and activates the PDCP duplication which is with the pre-allocated radio resource in block 502. The retransmission of the data is carried out by the PDCP duplication on the pre-allocated radio resource.

In this invention, the PDCP duplication is with pre-allocated radio resource and is activated by itself to retransmit the failed data. By performing the PDCP duplication, the UE could recover the failed transmission within the requirement of ST and avoid the application shutdown.

In the respect of how to trigger a UE to enter a survival state and activate the PDCP duplication (e.g., UE-based PDCP duplication), the followings may be considered. In an embodiment, the UE-based PDCP duplication may be triggered by Hybrid Automatic Repeat reQuest (HARQ) feedback for most stringent ST requirements. In an embodiment, the UE-based PDCP duplication may be triggered by duplication activation/deactivation Medium Access Control (MAC) Control Element (CE), or status reporting of RLC Protocol Data Unit (PDU), or PDCP status report for less stringent ST requirements. In another embodiment, a timer-based mechanism may apply to triggering the UE-based PDCP duplication. Details about these are provided as follows.

Figure 1:
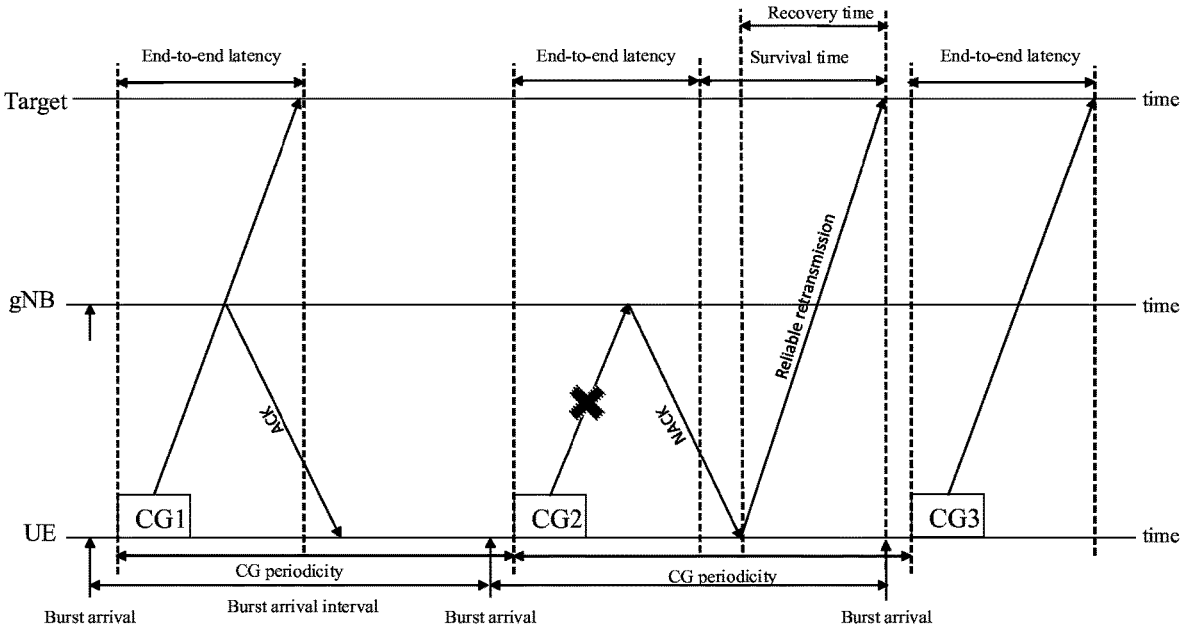
FIG. 1 is a schematic diagram illustrating reliable retransmission before the end of survival time.

The enhancement for survival time support only be needed for uplink, the following embodiments focus on reliable uplink transmission. As shown in FIG. 1, when the CG2 is not successfully transmitted, the gNB will reply a feedback to the UE.

Based on the protocol layer, the feedback may include:
    a) HARQ NACK or Downlink Control Information (DCI) dynamic retransmission grant,
    b) Duplication Activation/Deactivation Medium Access Control (MAC) Control Element (CE),
    c) Status reporting of Radio Link Control (RLC) Protocol Data Unit (PDU), or
    d) PDCP status report.

For a) HARQ feedback and dynamic retransmission grant, both of them are control signals of the physical layer. However, there may be no explicit HARQ ACK/NACK for Physical Uplink Shared Channel (PUSCH) in 5G New Radio (NR). If the PUSCH is not a CG, the UE can only figure out whether the PUSCH is successfully transmitted based on whether it gets a retransmission grant from the gNB or not. If the UE does not receive a retransmission grant (i.e., DCI 0_0/0_1 with NDI not toggled), the UE assumes that PUSCH is successfully received and decoded by the gNB. If the PUSCH is a CG, the UE can figure out whether the CG is successfully transmitted based on the downlink feedback indication (DFI) which indicates the HARQ ACK/NACK for the uplink CG. The HARQ NACK or dynamic retransmission grant in DCI may be some time period after the PUSCH transmission. Based on the value defined in 3GPP specification (TS 38.331), the DFI delay can be configured to 4 ms at maximum after the CG transmission.

For b) Duplication Activation/Deactivation MAC CE, it is a kind of control signal of the MAC layer. The gNB activates the PDCP duplication by sending the Duplication Activation MAC CE to the UE after the Radio Resource Control (RRC) determines that reliable retransmission is needed and instructs the MAC layer to initiate the MAC CE. The delay between the PUSCH and the MAC CE should be larger than the one between the PUSCH and the HARQ feedback because the delay includes the processing time of notification from the physical layer to the RRC layer and the processing time of instruction from the RRC layer to the MAC layer.

For c) status report of RLC PDU, it is a kind of control signal of the RLC layer. The Acknowledged Mode (AM) RLC entity of the gNB sends STATUS PDUs to the AM RLC entity of the UE in order to provide negative acknowledgements of RLC PDUs. Because one RLC PDU may include multiple MAC SDUs, the delay includes the processing time of disaggregating multiple MAC SDUs. Therefore, the delay between the PUSCH and the STATUS PDU should be larger than the one between the PUSCH and the HARQ feedback.

For d) PDCP status report, it is a kind of control signal of the PDCP layer. The gNB transmits PDCP status report in order to provide negative acknowledgements for PDCP SDU(s). Because one PDCP SDU may include multiple RLC SDUs, the delay includes the processing time of aggregating multiple RLC SDUs. Therefore, the delay between the PUSCH and the PDCP status report should be larger than the one between the PUSCH and the HARQ feedback.

Therefore, to trigger the reliable retransmission as early as possible, it would be better that the UE could activate PDCP duplication after receiving HARQ feedback. If the ST is not stringent (e.g., the ST is several times of transfer interval in Table 1), the feedback of b), c), d) could be used for triggering the UE-based PDCP duplication.

An alternative method of triggering UE-based PDCP duplication is a timer-based mechanism. The UE activates a timer (e.g., survival time timer) when it transmits an uplink grant. If the UE receives an ACK for the uplink grant before the timer expires, it stops the timer and the PDCP duplication is not triggered. The UE activates the timer again when it transmits the next uplink grant. If the UE receives a NACK for the uplink grant before the timer expires, it also stops the timer and the PDCP duplication is triggered. If the UE does not receive any feedback for the uplink grant, it triggers the PDCP duplication when the timer expires. The advantage of the timer-based mechanism is to avoid the case where the UE does not receives any feedback from the gNB. The timer length could be configured as the 5G Access Network Packet Delay Budget (5G-AN PDB) which is equal to PDB minus a static latency for the Core Network Packet Delay Budget (CN PDB). The timer length could also be configured as transfer interval minus a static latency for core network latency. Another advantage of the timer based mechanism is that the timer length could be used to control the activation of UE-based PDCP duplication based on the stringent degree of the UE. The gNB may configure the UE with a short ST timer when the ST of the UE is most stringent while a long ST timer when the ST of the UE is less stringent. The gNB may alternatively configure the UE with a number of NACK that the UE tolerate before the ST timer expires according to the stringent case of the UE. The number of NACK may represent consecutive or non-consecutive failed transmissions. For example, for the most stringent case, the UE can only tolerate one NACK. But for less stringent case, the UE can tolerate more than one NACK. The following is an example of configuration of the ST timer and the number of NACK.

ConfiguredGrantConfig Information Element

```
-- ASN1START
-- TAG-CONFIGUREDGRANTCONFIG-START
ConfiguredGrantConfig ::=              SEQUENCE {
    SurvivalTimeTimer                      INTEGER
    {1..64}                                OPTIONAL  -- Need R
```

-continued

```
NumberOfFailedTransmission          ENUMERATED {n1, n2, n3, n4, n8},
OPTIONAL   -- Need R
...
}
```

In the respect of radio resource allocation for UE-based PDCP duplication, the followings may be considered. In an embodiment, the UE is configured with an enabler indicating whether the UE-based PDCP duplication is allowed, wherein if the enabler is absent or the enabler indicating that the UE-based PDCP duplication is not allowed, the pre-allocated radio resource is released and the UE-based PDCP duplication is not allowed to be performed. Details about these are provided as follows.

During 3GPP Rel-16, gNB-based PDCP duplication was proposed. The gNB activates PDCP duplication by sending Duplication Activation MAC CE to the UE. However, as described in the previous section, gNB-based PDCP duplication may cost additional processing time by the gNB and the retransmission may exceed the ST. UE-based PDCP duplication that the UE activates PDCP duplication after receiving the HARQ NACK is benefit for the most stringent cases of ST. However, the drawback is that radio resource for the PDCP duplication needs to be pre-allocated by the gNB to enable the reliable retransmission as soon as possible when the UE enters the survival state. In order not to waste the radio resource, the radio resource could be configured as a type of shared resource. When the gNB does not success-fully receive the uplink grant from the UE, it implies the UE will automatically activate the PDCP duplication on the pre-allocated radio resource. The gNB should not allocate the pre-allocated radio resource for other UEs. After the gNB successfully receives the uplink grant for several times (i.e., the times may be configured by the gNB), the gNB could allocate the pre-allocated radio resource for other UEs.

For the configuration for the pre-allocated radio resource, an enabler in ConfiguredGrantConfig (e.g., UEbasedPDCP-Duplication) listed below can be configured for the UE performing UE-based PDCP duplication. When the enabler is absent, the UE should release the current value and not be allowed to perform UE-based PDCP duplication on the uplink configured grant.

ConfiguredGrantConfig Information Element

```
-- ASN1START
-- TAG-CONFIGUREDGRANTCONFIG-START
ConfiguredGrantConfig ::=   SEQUENCE {
   UEbasedPDCPDuplication   BOOLEAN   OPTIONAL   --
Need R
   ...
}
```

In the respect of how to stop a UE from performing PDCP duplication and exit the survival state, the followings may be considered. In an embodiment, the UE-based PDCP dupli-cation is deactivated after receiving a certain number of positive acknowledgement (ACKs) for the data on the configured grant(s) for the UE-based PDCP duplication. In another embodiment, the UE-based PDCP duplication is deactivated if no ACK for the data on the configured grant(s) for the UE-based PDCP duplication is received when a timer expires. In an embodiment, an indication is transmitted to the base station to notify the deactivation of the UE-based PDCP duplication. In another embodiment, the deactivation of the UE-based PDCP duplication is implicitly indicated to the base station. Details about these are provided as follows.

Since the pre-allocated radio resource is dedicated for the UE when the UE enters the survival state, it is beneficial for the resource usage utilization if the gNB can stop the PDCP duplication in time. There are some possible methods to stop the UE-based PDCP duplication.

a) Explicit indication from the UE: The UE transmits an indication to the gNB after a certain number of (consecutive) successful transmission. (i.e., the certain number successful transmission may be consecutive or inconsecutive.) After receiving the indication, the gNB can allocate the radio resource to other UEs. The number of successful transmis-sions could be configured by the gNB. An example of the configuration is listed below. Using small number of suc-cessful transmissions is beneficial for radio resource utili-zation, but the ping pong effect is more likely to occur. On the contrary, adopting larger number of successful transmis-sions could reduce the activation/deactivation frequency and make the PDCP duplication process more stable.

ConfiguredGrantConfig Information Element

```
-- ASN1START
-- TAG-CONFIGUREDGRANTCONFIG-START
ConfiguredGrantConfig ::=   SEQUENCE {
   NumberOfConsecutiveTransmission   ENUMERATED {n1, n2, n3, n4, n8},
OPTIONAL   -- Need R

...

}
```

11 b) Implicit indication from the UE: After receiving a certain number of successful transmissions, the gNB allocates the radio resource to other UEs. The difference between implicit indication and explicit indication is that this method does not need to transmit an indication and radio resource usage is more efficient.

c) Timer-based: A timer of the gNB is triggered when the HARQ feedback is transmitted to the UE. When the timer expires and the gNB does not successfully receive any uplink grant from the UE, it implies that the UE may lose the connection and the gNB could allocate the radio resource to other UEs. When the gNB successfully receives at least one uplink grant before the timer expires, the gNB should dedicate the radio resource for the UE until receiving a certain number of successful transmissions.

By exiting UE-based PDCP duplication as early as possible, the radio resource for the PDCP duplication could be reused by other UEs.

In the respect of procedures of UE-based PDCP duplication, the following Table 2 summarizes the first embodiment to the seventh embodiments of the present application.

TABLE 2

| | UE procedure | gNB procedure | Entering survival state based on the HARQ feedback | Entering survival state based on a timer | Leaving survival state implicitly | Leaving survival state explicitly | Leaving survival state based on a timer |
|---|---|---|---|---|---|---|---|
| First Embodiment | ✓ | | ✓ (only one NACK) | | ✓ (with no indication from the UE) | | |
| Second Embodiment | ✓ | | ✓ (combine the # of NACK and a timer) | ✓ (combine the # of NACK and a timer) | | ✓ (with an indication from the UE) | |
| Third Embodiment | ✓ | | ✓ (the # of NACK) | | | | ✓ |
| Fourth Embodiment | ✓ | | ✓ (combine the # of NACK and a timer) | ✓ (combine the # of NACK and a timer) | | | ✓ |
| Fifth Embodiment | | ✓ | ✓ (separate the # of NACK and a timer) | | ✓ (only one of implicit or explicit mechanism will be implemented) | ✓ (only one of implicit or explicit mechanism will be implemented) | |
| Sixth Embodiment | | ✓ | | ✓ (separate the # of NACK and a timer) | ✓ (only one of implicit or explicit mechanism will be implemented) | ✓ (only one of implicit or explicit mechanism will be implemented) | |
| Seventh Embodiment | | ✓ | ✓ | | | | ✓ |

These embodiments discussed the main procedures for UE-based PDCP duplication. It is not possible to list all the procedures and the steps (e.g., PDCP duplication activation from the UE/gNB or survival state failure indication from the UE/gNB) for different procedures may be combined with each other to form a new procedure.

The first embodiment to the fourth embodiment are from the perspective of the UE so that most of the timer (e.g., $ST_{UE}$ timer) or PDCP duplication is activated by the UE.

The fifth embodiment to the seventh embodiment are from the perspective of the gNB so that most of the timer (e.g., $ST_{gNB}$ timer) or PDCP duplication is activated by the gNB.

Figure 6:
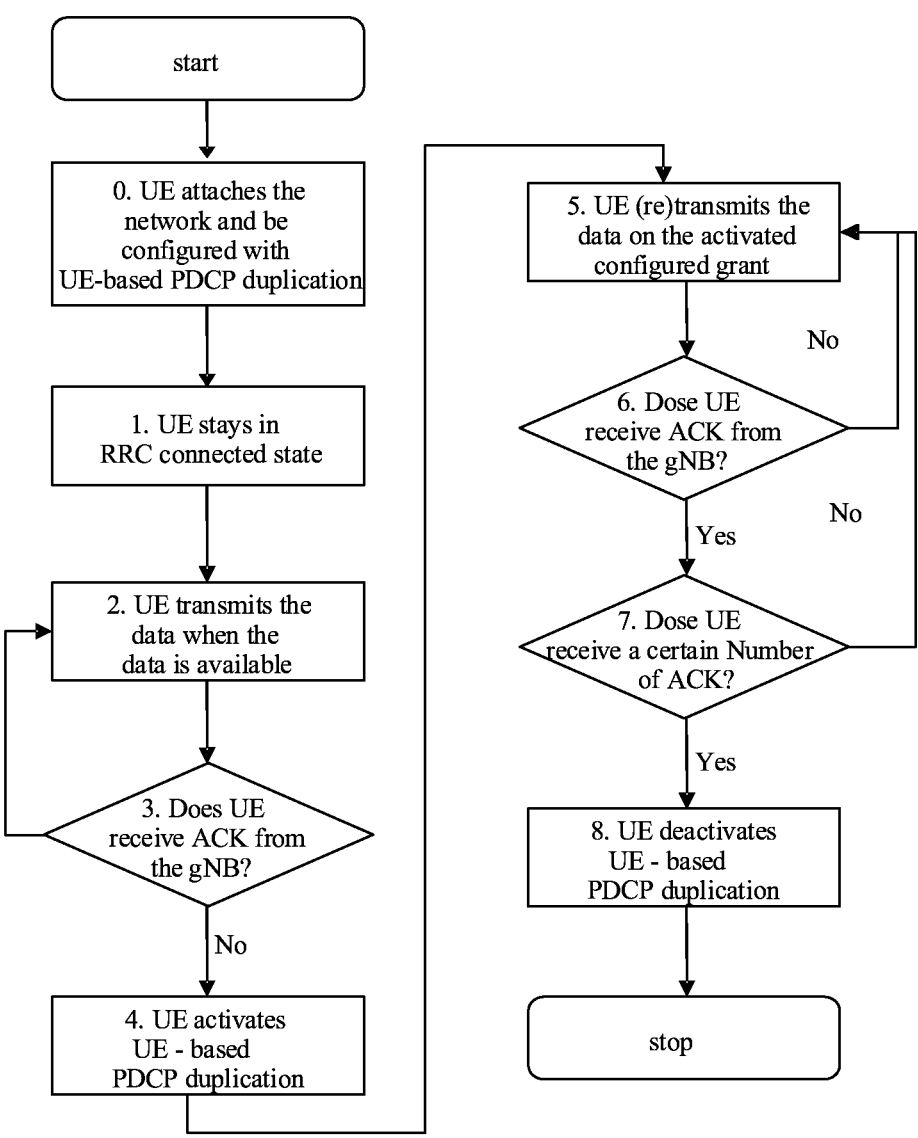
FIG. 6 is a flowchart of a UE procedure of activation and deactivation of UE-based PDCP duplication without an ST timer according to a first embodiment of the present application.

FIG. 6 shows an example of the UE side flow chart for UE-based PDCP duplication without an ST timer according to a first embodiment of the present application. Referring to FIG. 6, the method of avoiding survival time failure performed by the UE in the first embodiment includes the following steps:

Step 0: The UE attaches to the network and then it is configured with UE-based PDCP duplication. The UE is configured with more than one RLC entity (e.g., 4) for PDCP duplication where part of the RLC entities (e.g., 2) are for non-UE-based PDCP and part of the RLC entities (e.g., 2) are for UE-based PDCP duplication. The UE may also be configured with configured grants on each RLC entity. The UE is also configured with a number of ACK which the UE should receive before leaving the survival state.

Step 1: After successfully attaching to the network, the UE enters RRC connected state.

Step 2: The UE transmits the data on the configured grant(s) for non-UE-based PDCP duplication.

Step 3: The UE checks whether an ACK for the transmitted data is received. As described, the ACK should be a HARQ ACK while the cases of status report from RLC or PDCP are not precluded. If the UE receives an ACK, it goes back to step 2 and be ready for transmitting the next configured grant. If the UE receives a NACK, the UE goes to step 4.

Step 4: The UE activates UE-based PDCP duplication on the RLC entity for UE-based PDCP duplication.

Note: If there are more than one RLC entities configured for UE-based PDCP duplication, the UE may activate UE-based PDCP on all the RLC entities to achieve the strongest reliability.

Step 5: The UE retransmits (i.e., from step 4 or 6) or transmits (i.e., from step 7) the data on the configured grant(s) for UE-based PDCP duplication.

Step 6: The UE checks whether an ACK for the (re) transmitted data is received. If the UE receives an ACK, it counts the ACK and goes to step 7 to do a further check. If the UE receives a NACK, the UE goes back to step 5 to retransmit the data.

Step 7: The UE checks whether a certain number of ACK is received. If yes, the UE goes to step 8. Otherwise, the UE goes back to step 5 to transmit the next data on the configured grant for UE-based PDCP duplication.

Step 8: The UE deactivates UE-based PDCP duplication on the RLC entity for UE-based PDCP duplication.

Note: If there are more than one RLC entities configured for UE-based PDCP duplication, the UE may deactivate UE-based PDCP duplication on part of the RLC entities (i.e., relaxed reliability) and go back to step 4. The deactivated RLC entity may be pre-configured (e.g., the deactivation order is pre-configured) or indicated by Duplication Activation MAC CE from the gNB.

Figure 7:
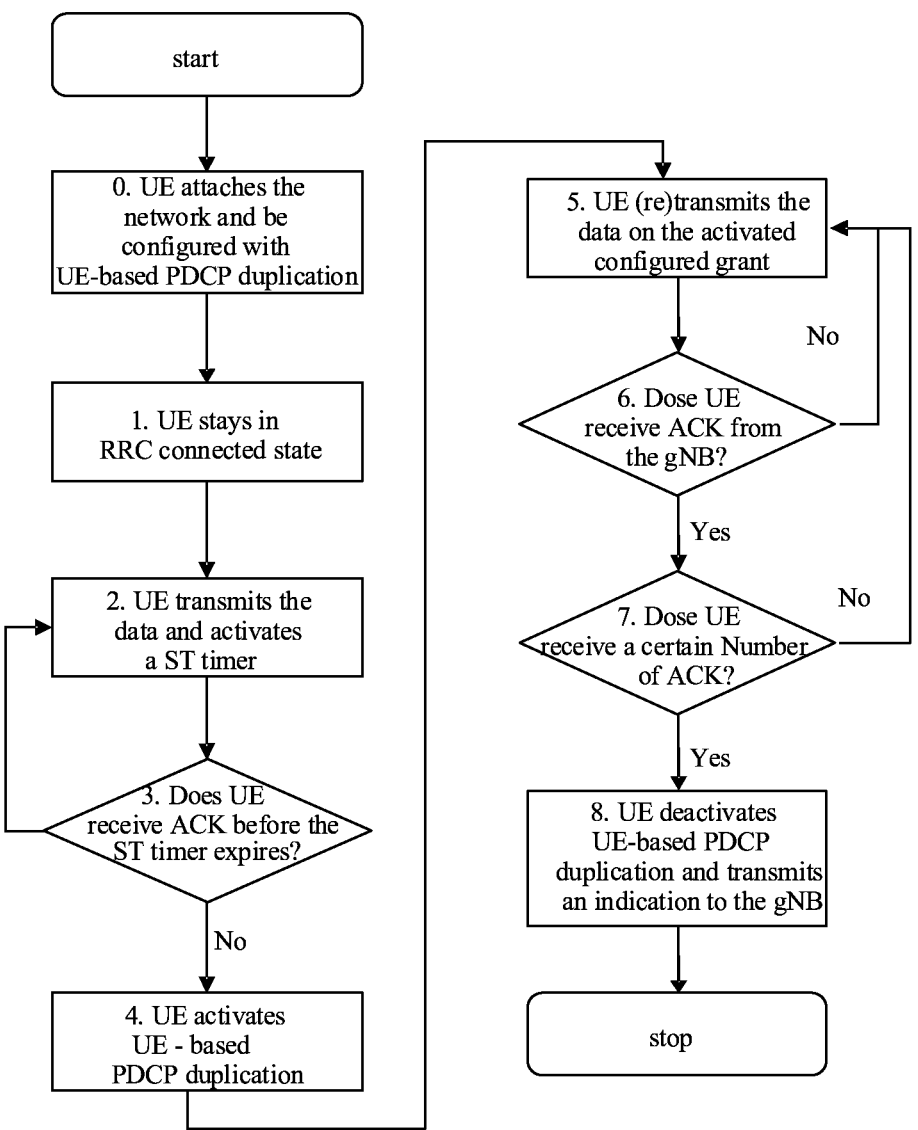
FIG. 7 is a flowchart of a UE procedure of activation and deactivation of UE-based PDCP duplication with an ST timer according to a second embodiment of the present application.

FIG. 7 shows an example of the UE side flow chart for UE-based PDCP duplication with an ST timer according to a second embodiment of the present application. The ST timer stops when the UE enters the survival state. The ST timer is used for triggering the survival state. Referring to FIG. 7, the method of avoiding survival time failure performed by the UE in the second embodiment includes the following steps:

Step 0: The UE attaches to the network and then it is configured with UE-based PDCP duplication. The UE is configured with a $ST_{UE}$ timer (i.e., an ST timer for the UE), a number of NACK which the UE can tolerate before the $ST_{UE}$ timer expires, and/or a number of ACK which the UE should receive before leaving the survival state.

Step 1: After successfully attaching to the network, the UE enters RRC connected state.

Step 2: The UE transmits the data on the configured grant(s) for non-UE-based PDCP duplication and activates the $ST_{UE}$ timer.

Step 3: The UE checks whether an ACK for the transmitted data is received before the $ST_{UE}$ timer expires. If the UE receives an ACK before the $ST_{UE}$ timer expires, it stops the $ST_{UE}$ timer and goes back to step 2 and be ready for transmitting the next configured grant. If the UE receives a number of NACK before the $ST_{UE}$ timer expires, it also stops the $ST_{UE}$ timer and goes to step 4. If the UE receives nothing until the $ST_{UE}$ timer expires, the UE goes to step 4. The gNB may also configure the UE with a number of NACK that the UE tolerates before the $ST_{UE}$ timer expires according to the stringent case of the UE. For example, for the most stringent case, the UE can only tolerate one NACK. But for less stringent case, the UE can tolerate more than one NACK.

Step 4: The UE activates UE-based PDCP duplication on the RLC entity for UE-based PDCP duplication.

Step 5: The UE retransmits (i.e., from step 4 or 6) or transmits (i.e., from step 7) the data on the configured grant(s) for UE-based PDCP duplication.

Step 6: The UE checks whether an ACK for the (re) transmitted data is received. If the UE receives an ACK, it counts the ACK and goes to step 7 to do a further check. If the UE receives a NACK, the UE goes back to step 5 to retransmit the data.

Step 7: The UE checks whether a certain number of ACK is received. If yes, the UE goes to step 8. Otherwise, the UE goes back to step 5 to transmit the next data on the configured grant for UE-based PDCP duplication.

Step 8: The UE deactivates UE-based PDCP duplication on the RLC entity for UE-based PDCP duplication and transmits an indication to the gNB to notify deactivation of UE-based PDCP duplication. The indication may be a control signal of physical layer, a MAC CE of MAC layer, or a RRC signal of RRC layer. Note that the indication may also be applied by the first embodiment.

Figure 8:
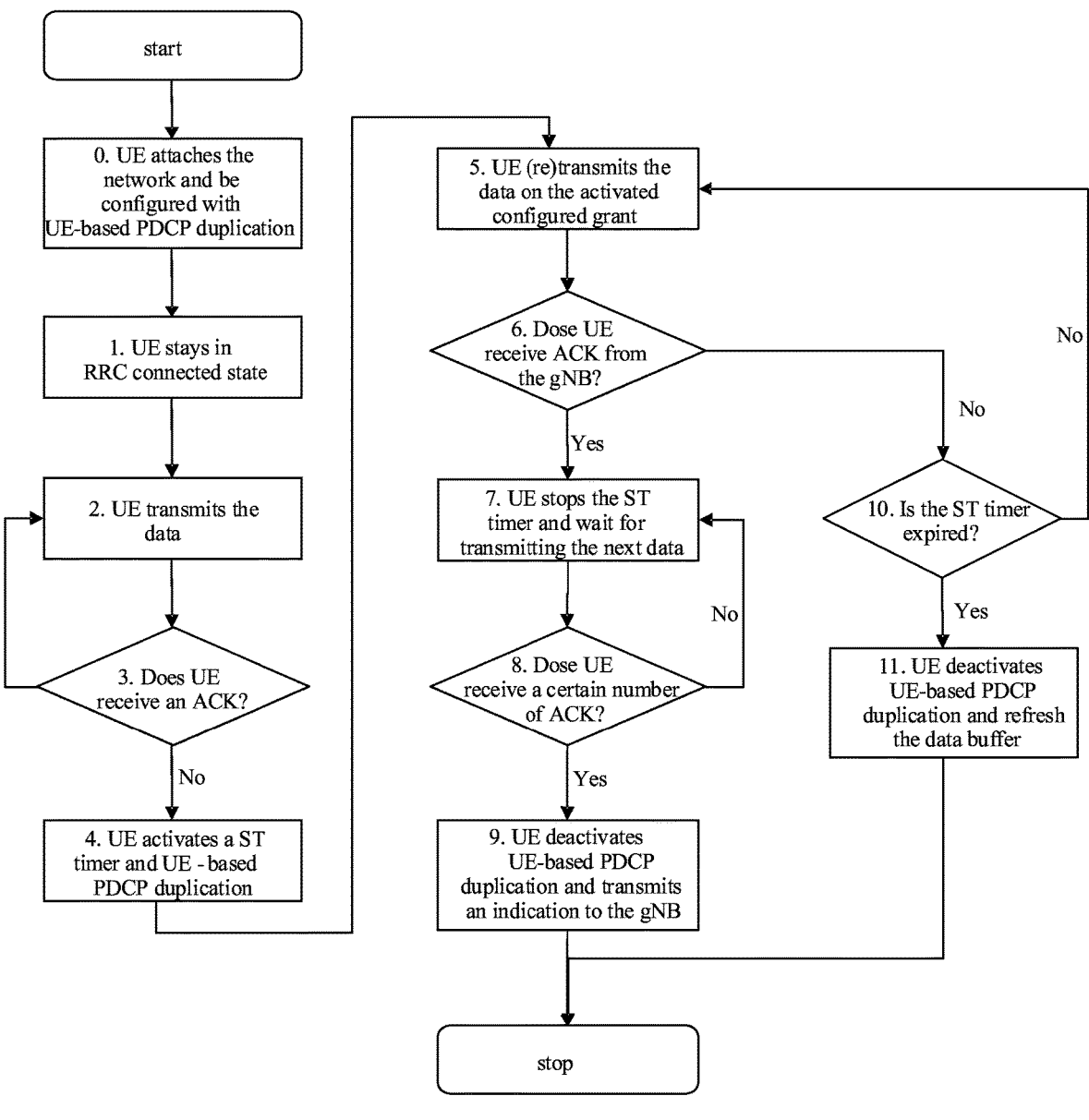
FIG. 8 is a flowchart of a UE procedure of activation and deactivation of UE-based PDCP duplication with an ST timer according to a third embodiment of the present application.

FIG. 8 shows an example of the UE side flow chart for UE-based PDCP duplication with an ST timer according to a third embodiment of the present application. The ST timer starts when the UE enters the survival state. The ST timer is used for controlling the UE behavior in the survival state. Referring to FIG. 8, the method of avoiding survival time failure performed by the UE in the third embodiment includes the following steps:

Step 0: The UE attaches to the network and then it is configured with UE-based PDCP duplication. The UE is configured with a $ST_{UE}$ timer (i.e., an ST timer for the UE), a number of NACK which the UE can tolerate before entering the survival state, and/or a number of ACK which the UE should receive before leaving the survival state.

Step 1: After successfully attaching to the network, the UE enters RRC connected state.

Step 2: The UE transmits the data on the configured grant(s) for non-UE-based PDCP duplication.

Step 3: The UE checks whether an ACK for the transmitted data is received. If the UE receives an ACK, it goes back to step 2 and be ready for transmitting the next configured grant. If the UE receives a NACK, it goes to step 4. The gNB may also configure the UE with a number of NACK that the UE tolerates before entering the survival state according to the stringent case of the UE. For example, for the most stringent case, the UE can only tolerate one NACK. But for less stringent case, the UE can tolerate more than one NACK.

Step 4: The UE activates the $ST_{UE}$ timer and UE-based PDCP duplication on the RLC entity for UE-based PDCP duplication.

Step 5: The UE retransmits the data on the configured grant(s) for UE-based PDCP duplication.

Step 6: The UE checks whether an ACK for the retransmitted data is received. If the UE receives an ACK, it goes to step 7. If the UE receives a NACK, the UE goes to step 10.

Step 7: The UE stops the $ST_{UE}$ timer and waits for transmitting the next data on the configured grant for UE-based PDCP duplication.

Step 8: The UE checks whether a certain number of ACK is received. If yes, the UE goes to step 9. Otherwise, the UE goes back to step 7.

Step 9: The UE deactivates UE-based PDCP duplication on the RLC entity/entities for UE-based PDCP duplication and transmits an indication to the gNB to notify deactivation of UE-based PDCP duplication.

Note: If there are more than one RLC entity configured for UE-based PDCP duplication, the UE may deactivate UE-based PDCP duplication on part of the RLC entities (i.e., relaxed reliability) and reactivate the $ST_{UE}$ timer and go back to step 4.

Step 10: The UE checks whether the $ST_{UE}$ timer is expired. If the $ST_{UE}$ timer is not expired, the UE goes back to step 5 to wait for retransmitting the data on the configured grant(s) for UE-based PDCP duplication. If the $ST_{UE}$ timer is expired, which means the UE fails to retransmit the data during the survival state, the UE goes to step 11.

Step 11: The UE deactivates UE-based PDCP duplication on the RLC entity for UE-based PDCP duplication and refresh the data in the HARQ buffer. The UE may transmit an indication to the gNB to notify the deactivation of UE-based PDCP duplication. The UE may also transmit a report to the gNB that the ST timer is expired and the reliable (re)transmission during the survival state is failed.

Figure 9:
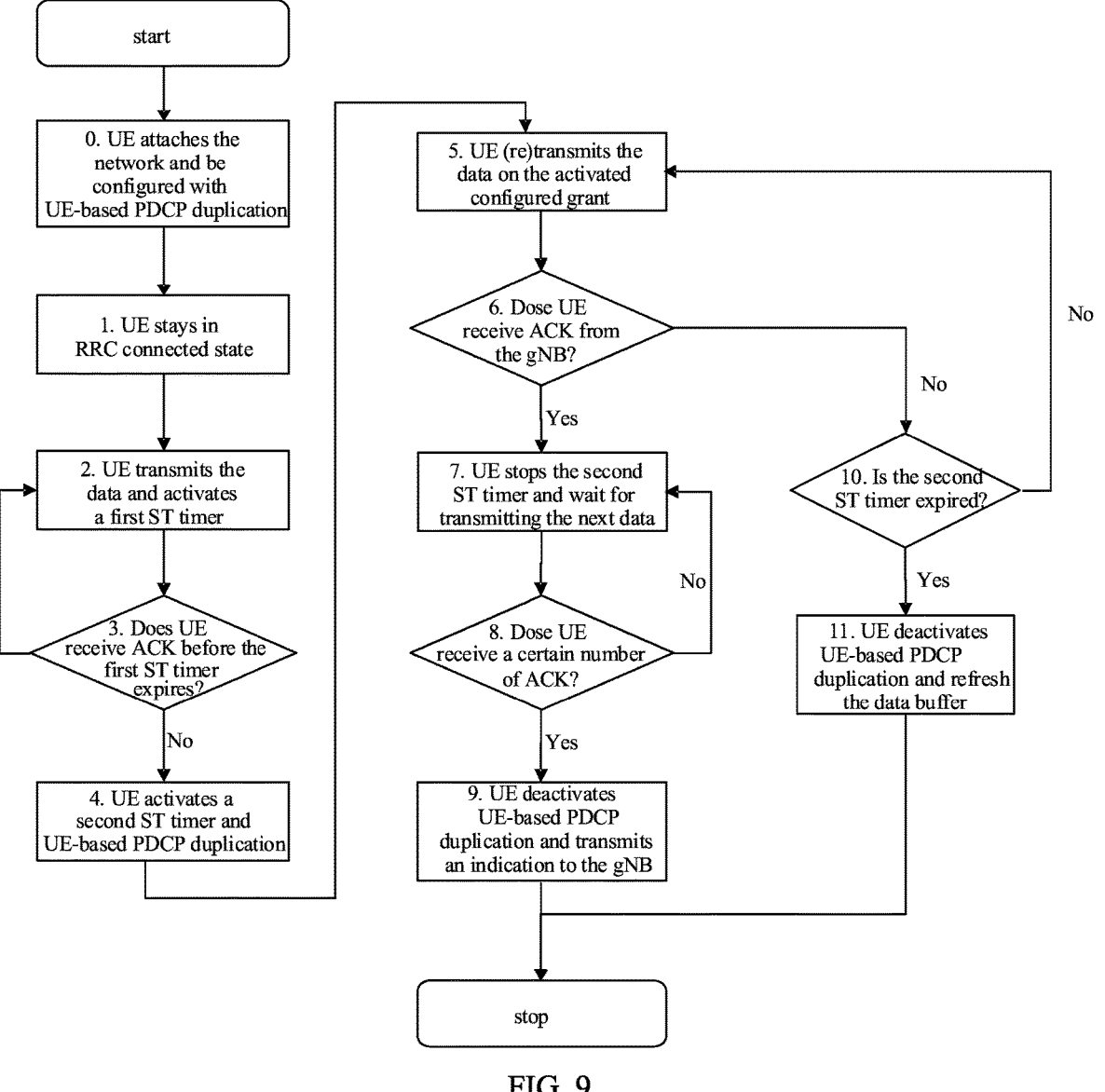
FIG. 9 is a flowchart of a UE procedure of activation and deactivation of UE-based PDCP duplication with two ST timers according to a fourth embodiment of the present application.

FIG. 9 shows an example of the UE side flow chart for UE-based PDCP duplication with two ST timers according to a fourth embodiment of the present application. The first ST timer is used for triggering the survival state. This embodiment is a combination of the second embodiment and the third embodiment. The UE enters the survival state after the first timer expires. The second ST timer is used for controlling the UE behavior in the survival state. The UE fails to retransmit the data after the second timer expires. Referring to FIG. 9, the method of avoiding survival time failure performed by the UE in the fourth embodiment includes the following steps:

Step 0: The UE attaches to the network and then it is configured with UE-based PDCP duplication. The UE is configured with a first $ST_{UE}$ timer and a second $ST_{UE}$ timer, a number of NACK which the UE can tolerate before entering the survival state, and/or a number of ACK which the UE should receive before leaving the survival state.

Step 1: After successfully attaching to the network, the UE enters RRC connected state.

Step 2: The UE transmits the data on the configured grant(s) for non-UE-based PDCP duplication and activates the first $ST_{UE}$ timer.

Step 3: The UE checks whether an ACK for the transmitted data is received before the first $ST_{UE}$ timer expires. If the UE receives an ACK before the first $ST_{UE}$ timer expires, it stops the first $ST_{UE}$ timer and goes back to step 2 and be ready for transmitting the next configured grant. If the UE receives a NACK before the first $ST_{UE}$ timer expires, it also stops the first $ST_{UE}$ timer and goes to step 4. If the UE receives nothing until the first $ST_{UE}$ timer expires, the UE goes to step 4. The gNB may also configure the UE with a number of NACK that the UE tolerates before the first $ST_{UE}$ timer expires according to the stringent case of the UE. For example, for the most stringent case, the UE can only tolerate one NACK. But for less stringent case, the UE can tolerate more than one NACK.

Step 4: The UE activates the second $ST_{UE}$ timer and UE-based PDCP duplication on the RLC entity for UE-based PDCP duplication.

Step 5: The UE retransmits the data on the configured grant(s) for UE-based PDCP duplication.

Step 6: The UE checks whether an ACK for the retransmitted data is received. If the UE receives an ACK, it goes to step 7. If the UE receives a NACK, the UE goes to step 10.

Step 7: The UE stops the second $ST_{UE}$ timer and waits for transmitting the next data on the configured grant for UE-based PDCP duplication.

Step 8: The UE checks whether a certain number of ACK is received. If yes, the UE goes to step 9. Otherwise, the UE goes back to step 7.

Step 9: The UE deactivates UE-based PDCP duplication on the RLC entity for UE-based PDCP duplication and transmits an indication to the gNB to notify deactivation of UE-based PDCP duplication.

Step 10: The UE checks whether the second $ST_{UE}$ timer is expired. If the second $ST_{UE}$ timer is not expired, the UE goes back to step 5 to wait for retransmitting the data on the configured grant(s) for UE-based PDCP duplication. If the second $ST_{UE}$ timer is expired, which means the UE fails to retransmit the data during the survival state, the UE goes to step 11.

Step 11: The UE deactivates UE-based PDCP duplication on the RLC entity for UE-based PDCP duplication and refresh the data in the HARQ buffer. The UE may transmit an indication to the gNB to notify the deactivation of UE-based PDCP duplication. The UE may also transmit a report to the gNB that the ST timer is expired and the reliable (re)transmission during the survival state is failed.

Figure 10:
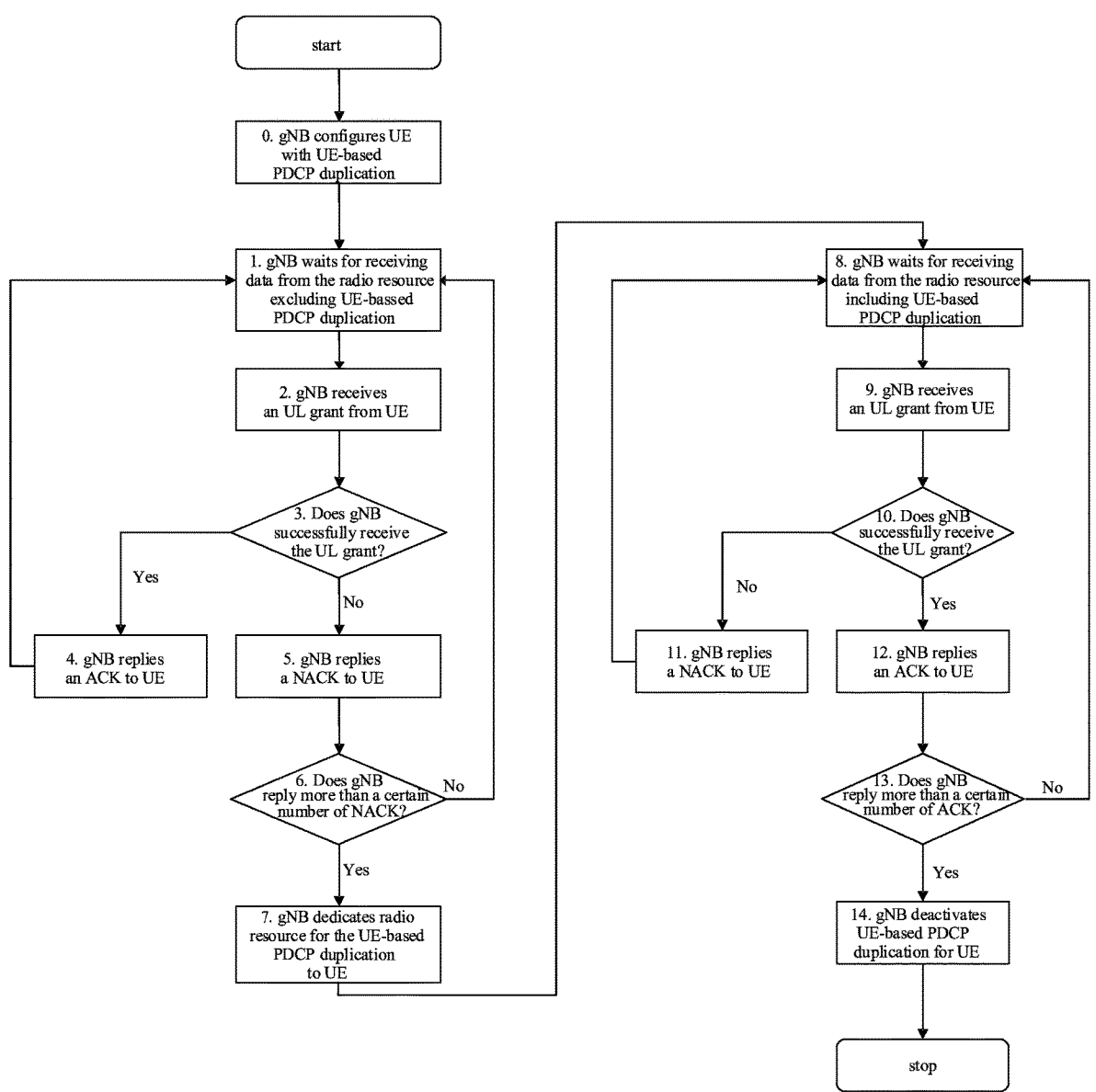
FIG. 10 is a flowchart of a gNB procedure of activation and deactivation of UE-based PDCP duplication without an ST timer according to a fifth embodiment of the present application.

FIG. 10 shows an example of the gNB side flow chart for UE-based PDCP duplication without an ST timer according to a fifth embodiment of the present application. Referring to FIG. 10, the method of avoiding survival time failure performed by the gNB in the fifth embodiment includes the following steps:

Step 0: After the UE completes attaching to the network, the gNB configures the UE with UE-based PDCP duplication. The gNB may configure more than one (e.g., 3) RLC entity for PDCP duplication where one or more (e.g., 2) RLC entity is for non-UE-based PDCP and one RLC entity is for UE-based PDCP duplication. The gNB may also configure the UE with a configured grant (e.g., type 2 configured grant or new type configured grant) on each RLC entity. The new type configured grant means that the UE could activate the configured grant without an activation from the gNB. The configuration may include the number of NACK which the UE can tolerate before entering the survival state and the number of ACK which the UE should receive before leaving the survival state. The number of NACK may be configured according to the ST length. For the most stringent case where the ST length is equal to one transmission interval, the number of NACK can be configured as 1. For the less stringent case where the ST length is equal to multiple transmission intervals, the number of NACK can be more than 1.

Step 1: Because the radio resource (or configured grant) for the UE-based PDCP duplication will be activated after the UE or the gNB activates UE-based PDCP configuration, the gNB waits for receiving data from the radio resource excluding the RLC entity for UE-based PDCP duplication. The gNB may schedule a dynamic grant on the radio resource (i.e., the dynamic grant preempts the configured grant) for the UE-based PDCP duplication such that the radio resource can be used by other UEs (i.e., this is inter-UE prioritization) or by the UE (i.e., this is intra-UE prioritization and the dynamic grant has higher priority over the configured grant) before activating the PDCP duplication.

Step 2: The gNB receives an uplink grant from the UE.

Step 3: The gNB checks whether the uplink grant is successfully received (i.e., the uplink grant is successfully decoded. If the uplink grant is received successfully, the gNB goes to step 4 to reply the UE with an ACK. Otherwise, the gNB goes to step 5 to reply the UE with a NACK.

Step 4: The gNB replies an ACK to the UE and goes back to step 1 to wait for receiving the next data from the UE.

Step 5: The gNB replies a NACK to the UE and goes to step 6 to do a further check.

Step 6: The gNB counts the number of replied NACK and checks whether a certain number of NACK is replied to the UE. If the number of NACK does not exceed the configured value, the gNB goes back to step 1 to wait for receiving data retransmission from the UE. If the number of NACK exceeds the configured value, the gNB should know that the UE needs more reliable transmission and should stop scheduling dynamic grant(s) on the radio resource for UE-based PDCP duplication to other UEs or to the UE.

Step 7: The gNB dedicates the radio resource for the UE-based PDCP duplication to the UE. For type 2 configured grant configuration, the gNB may transmit an indication (e.g., configured grant activation in DCI or duplication activation MAC CE) to activate the PDCP duplication on this configured grant. For new type configured grant configuration, the gNB may stop scheduling dynamic grant(s) on the radio resource for UE-based PDCP duplication without transmitting an indication.

Note: If there are more than one RLC entity configured for UE-based PDCP duplication, the gNB may dedicate all the RLC entities for UE-based PDCP duplication to the UE to achieve the strongest reliability.

Step 8: The radio resource (or configured grant) for the UE-based PDCP duplication is activated, and the gNB monitors on the radio resource (i.e., configured grants for non-UE-based PDCP duplication and UE-based PDCP duplication) and waits for receiving data from the radio resource.

Step 9: The gNB receives an uplink grant from the UE.

Step 10: The gNB checks whether the uplink grant is successfully received. If the uplink grant is received successfully, the gNB goes to step 12 to replies the UE with an ACK. Otherwise, the gNB goes to step 11 to replies the UE with a NACK.

Step 11: The gNB replies a NACK to the UE and goes back to step 8 to wait for receiving data retransmission from the UE.

Step 12: The gNB replies an ACK to the UE and goes to step 13 to do a further check.

Step 13: The gNB counts the number of replied ACK and checks whether a certain number of NACK is replied to the UE. If the number of ACK does not exceed the configured value, the gNB goes back to step 8 to wait for receiving the next data from the UE. If the number of ACK exceeds the configured value, the gNB knows that the UE no longer needs reliable transmission and should deactivate the UE-based PDCP duplication.

Step 14: The gNB deactivates the UE-based PDCP duplication for the UE. For type 2 configured grant configuration, the gNB may transmit an indication (e.g., configured grant deactivation in DCI or duplication deactivation MAC CE) to deactivate the PDCP duplication on this configured grant. For new type configured grant configuration, the gNB may start to schedule dynamic grant(s) on the radio resource for UE-based PDCP duplication without transmitting any indication.

Note: If there are more than one RLC entity configured for UE-based PDCP duplication, the gNB may deactivate UE-based PDCP duplication on part of the RLC entities (i.e., relaxed reliability) and go back to step 7.

Figure 11:
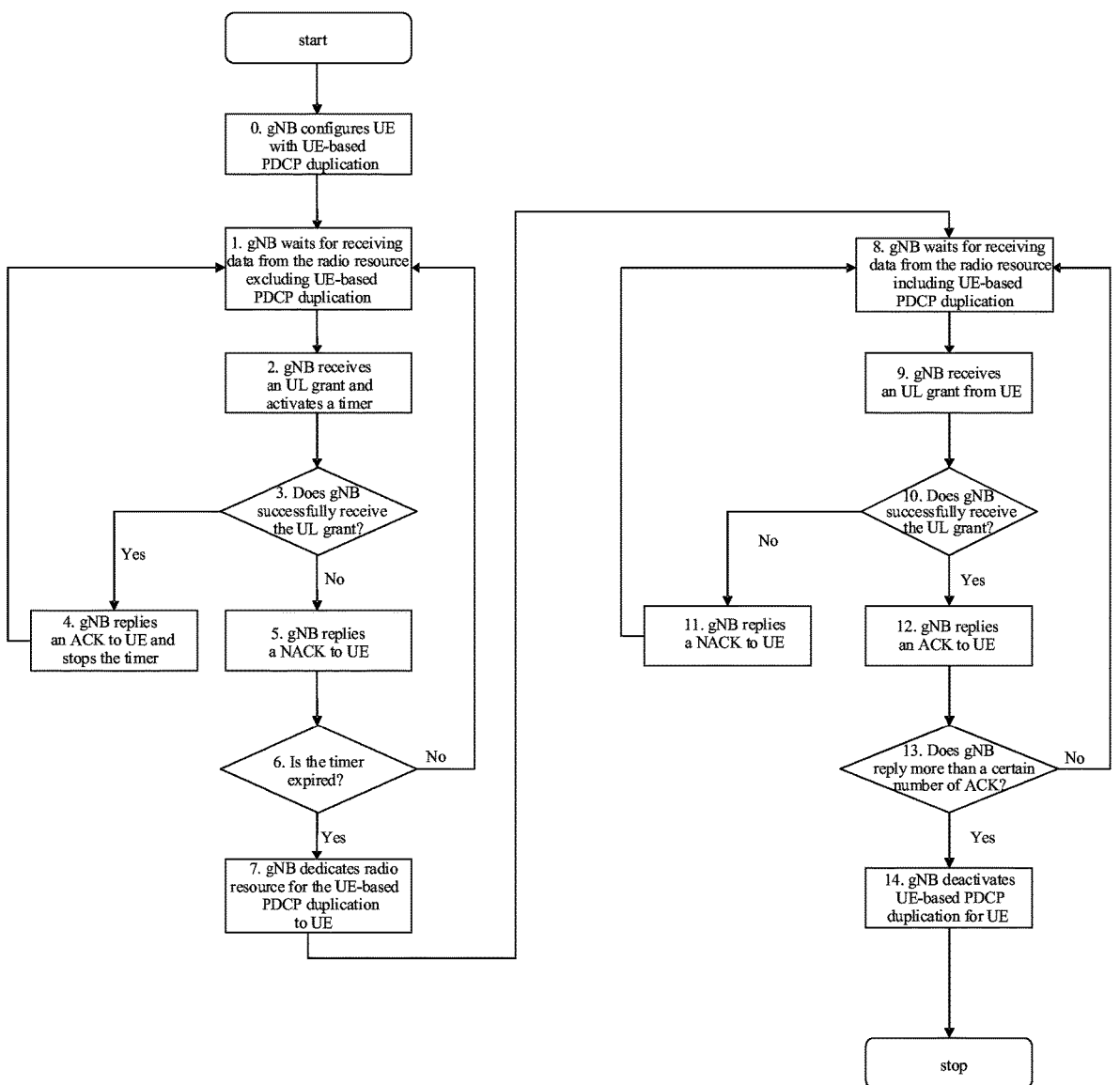
FIG. 11 is a flowchart of a gNB procedure of activation and deactivation of UE-based PDCP duplication with an ST timer according to a sixth embodiment of the present application.

FIG. 11 shows an example of the gNB side flow chart for UE-based PDCP duplication with an ST timer according to a sixth embodiment of the present application. Referring to FIG. 11, the method of avoiding survival time failure performed by the gNB in the sixth embodiment includes the following steps:

Step 0: After the UE completes attaching to the network, the gNB configures the UE with UE-based PDCP duplication. The gNB may configure more than one (e.g., 4) RLC entity for PDCP duplication where part of the RLC entities (e.g., 2) are for non-UE-based PDCP and part of the RLC entities (e.g., 2) are for UE-based PDCP duplication. The gNB may also configure the UE with a configured grant (e.g., type 2 configured grant or new type configured grant) on each RLC entity. The new type configured grant means that the UE could activate the configured grant without an activation from the gNB. The configuration may include a timer (e.g., a $ST_{UE}$ timer) length which indicates the maximal time the UE can tolerate before entering the survival state and the number of ACK which the UE should receive before leaving the survival state.

Step 1: The gNB waits for receiving data from the radio resource excluding the RLC entity for UE-based PDCP duplication.

Step 2: The gNB receives an uplink grant from the UE. If the received uplink grant is an initial transmission, the gNB activates a timer (e.g., a $ST_{gNB}$ timer used in gNB). If the received uplink grant is a retransmission, the gNB does not reactivates the timer. The $ST_{gNB}$ timer length could be configured equal to the $ST_{UE}$ timer length or be configured to $ST_{UE}$ timer length minus the timing advances of the UE.

Step 3: The gNB checks whether the uplink grant is successfully received (i.e., the uplink grant is successfully decoded). If the uplink grant is received successfully, the gNB goes to step 4 to reply the UE with an ACK. Otherwise, the gNB goes to step 5 to reply the UE with a NACK.

Step 4: The gNB replies an ACK to the UE and goes back to step 1 to wait for receiving the next data from the UE.

Step 5: The gNB replies a NACK to the UE and goes to step 6 to do a further check.

Step 6: The gNB checks whether the ST g NB timer is expired. If the ST g NB timer is not expired, the gNB goes back to step 1 to wait for receiving data retransmission from the UE. If the $ST_{gNB}$ timer is expired, the gNB should know that the UE needs more reliable transmission and should stop scheduling dynamic grant(s) on the radio resource for UE-based PDCP duplication to other UEs or to the UE.

Step 7: The gNB dedicates the radio resource for the UE-based PDCP duplication to the UE. For type 2 configured grant configuration, the gNB may transmit an indication (e.g., configured grant activation in DCI or duplication activation MAC CE) to activate the PDCP duplication on this configured grant. For new type configured grant configuration, the gNB may stops scheduling dynamic grant(s) on the radio resource for UE-based PDCP duplication without transmitting an indication.

Step 8: The radio resource (or configured grant) for the UE-based PDCP duplication is activated, and the gNB monitors on the radio resource (i.e., configured grants for non-UE-based PDCP duplication and UE-based PDCP duplication) and waits for receiving data from the radio resource.

Step 9: The gNB receives an uplink grant from the UE.

Step 10: The gNB checks whether the uplink grant is successfully received. If the uplink grant is received successfully, the gNB goes to step 12 to replies the UE with an ACK. Otherwise, the gNB goes to step 11 to replies the UE with a NACK.

Step 11: The gNB replies a NACK to the UE and goes back to step 8 to wait for receiving data retransmission from the UE.

Step 12: The gNB replies an ACK to the UE and goes to step 13 to do a further check.

Step 13: The gNB counts the number of replied ACK and checks whether a certain number of NACK is replied to the UE. If the number of ACK does not exceed the configured value, the gNB goes back to step 8 to wait for receiving the next data from the UE. If the number of ACK exceeds the configured value, the gNB knows that the UE no longer needs reliable transmission and should deactivate the UE-based PDCP duplication.

Step 14: The gNB deactivates the UE-based PDCP duplication for the UE. For type 2 configured grant configuration, the gNB may transmit an indication (e.g., configured grant deactivation in DCI or duplication deactivation MAC CE) to deactivate the PDCP duplication on this configured grant. For new type configured grant configuration, the gNB may start to schedule dynamic grant(s) on the radio resource for UE-based PDCP duplication without transmitting any indication.

Figure 12:
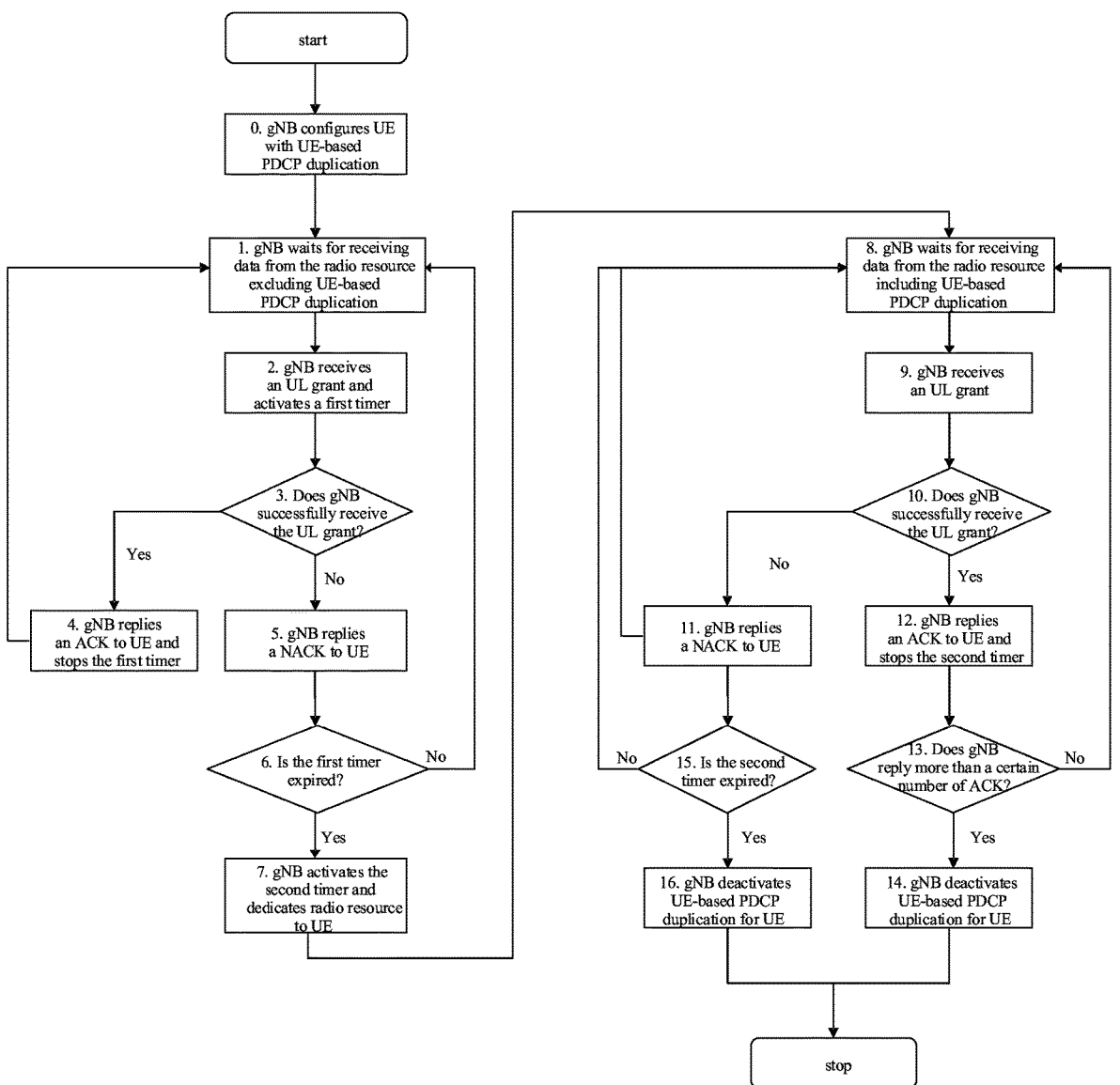
FIG. 12 is a flowchart of a gNB procedure of activation and deactivation of UE-based PDCP duplication with two ST timers according to a seventh embodiment of the present application.

FIG. 12 shows an example of the gNB side flow chart for UE-based PDCP duplication with two ST timers according to a seventh embodiment of the present application. The first ST timer is used before triggering the survival state. The gNB stops scheduling dynamic grants on the radio resources for UE-based PDCP duplication to other UEs or to the UE after the first timer expires. The second ST timer is activated after the UE enters the survival state for controlling the UE behavior in the survival state. The UE fails to retransmit the data after the second timer expires. Referring to FIG. 12, the method of avoiding survival time failure performed by the gNB in the seventh embodiment includes the following steps:

Step 0: After the UE completes attaching to the network, the gNB configures the UE with UE-based PDCP duplication.

Step 1: The gNB waits for receiving data from the radio resource excluding the RLC entity for UE-based PDCP duplication.

Step 2: The gNB receives an uplink grant from the UE. If the received uplink grant is an initial transmission, the gNB activates a first timer (e.g., a first $ST_{gNB}$ timer used in gNB). If the received uplink grant is a retransmission, the gNB does not reactivates the timer.

Step 3: The gNB checks whether the uplink grant is successfully received. (i.e., the uplink grant is successfully decoded.) If the uplink grant is received successfully, the gNB goes to step 4 to reply the UE with an ACK. Otherwise, the gNB goes to step 5 to reply the UE with a NACK.

Step 4: The gNB replies an ACK to the UE and goes back to step 1 to wait for receiving the next data from the UE.

Step 5: The gNB replies a NACK to the UE and goes to step 6 to do a further check.

Step 6: The gNB checks whether the first $ST_{gNB}$ timer is expired. If the first $ST_{gNB}$ timer is not expired, the gNB goes back to step 1 to wait for receiving data retransmission from the UE. If the first $ST_{gNB}$ timer is expired, the gNB should know that the UE needs more reliable transmission and should stop scheduling dynamic grant(s) on the radio resource for UE-based PDCP duplication to other UEs or to the UE.

Step 7: The gNB activates a second timer (e.g., a second $ST_{gNB}$ timer used in gNB) dedicates the radio resource for the UE-based PDCP duplication to the UE. The gNB may transmit an indication (e.g., configured grant activation in DCI or duplication activation MAC CE) to activate the PDCP duplication on the configured grant(s) based on the stringent degree of the UE. For example, for the most stringent case, the gNB may activate all the configured grant configurations for PDCP duplication on all the RLC entities. For the less stringent case, the gNB may activate part of configured grant configuration or part of the RLC entities.

Step 8: The radio resource (or configured grant) for the UE-based PDCP duplication is activated, and the gNB monitors on the radio resource (i.e., configured grants for non-UE-based PDCP duplication and UE-based PDCP duplication) and waits for receiving data from the radio resource.

Step 9: The gNB receives an uplink grant from the UE.

Step 10: The gNB checks whether the uplink grant is successfully received. If the uplink grant is received successfully, the gNB goes to step 12 to replies the UE with an ACK. Otherwise, the gNB goes to step 11 to replies the UE with a NACK.

Step 11: The gNB replies a NACK to the UE and goes back to step 8 to wait for receiving data retransmission from the UE.

Step 12: The gNB replies an ACK to the UE, stops the second $ST_{gNB}$ timer, and goes to step 13 to do a further check.

Step 13: The gNB counts the number of replied ACK and checks whether a certain number of NACK is replied to the UE. If the number of ACK does not exceed the configured value, the gNB goes back to step 8 to wait for receiving the next data from the UE. If the number of ACK exceeds the configured value, the gNB knows that the UE no longer needs reliable transmission and should deactivate the UE-based PDCP duplication.

Step 14: The gNB deactivates the UE-based PDCP duplication for the UE. For type 2 configured grant configuration, the gNB may transmit an indication (e.g., configured grant deactivation in DCI or duplication deactivation MAC CE) to deactivate the PDCP duplication on this configured grant. For new type configured grant configuration, the gNB may start to schedule dynamic grant(s) on the radio resource for UE-based PDCP duplication without transmitting any indication.

Step 15: The gNB checks whether the second $ST_{gNB}$ timer is expired. If the second $ST_{gNB}$ timer is not expired, the gNB goes back to step 8 to wait for receiving data retransmission from the UE. If the second $ST_{gNB}$ timer is expired, the gNB should know that the UE fails to retransmit the data during the survival state.

Step 16: The gNB deactivates the UE-based PDCP duplication for the UE or releases the configured grant configurations (i.e., including UE-based and non-UE-based PDCP duplication) for the UE.

Commercial interests for some embodiments are as follows. 1. solving issues in the prior art. 2. recovering the failed transmission within the requirement of ST and avoiding the application shutdown. 3. reusing the radio resource for the PDCP duplication by other UEs to increase resource efficiency. 4. providing a good communication performance. Some embodiments of the present disclosure are used by chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

The embodiment of the present application further provides a computer readable storage medium for storing a computer program. The computer readable storage medium enables a computer to execute corresponding processes implemented by the UE/BS in each of the methods of the embodiment of the present disclosure. For brevity, details will not be described herein again.

The embodiment of the present application further provides a computer program product including computer program instructions. The computer program product enables a computer to execute corresponding processes implemented by the UE/BS in each of the methods of the embodiment of the present disclosure. For brevity, details will not be described herein again.

The embodiment of the present application further provides a computer program. The computer program enables a computer to execute corresponding processes implemented by the UE/BS in each of the methods of the embodiment of the present disclosure. For brevity, details will not be described herein again.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor including the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may include at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

While the present application has been described in connection with what is considered the most practical and preferred embodiments, it is understood that the present application is not limited to the disclosed embodiments but is intended to cover various arrangements made without departing from the scope of the broadest interpretation of the appended claims.

The invention claimed is:

1. A method of avoiding survival time (ST) failure, performed by a user equipment (UE) in a network, the method comprising:
   entering radio resource control (RRC) connected state;
   being configured with an uplink configured grant by a base station (BS);
   being configured with pre-allocated radio resource by the BS;
   being configured with an enabler with boolean values indicating Packet Data Convergence Protocol (PDCP) duplication for retransmitting the data on the pre-allocated radio resource associated with one or more Radio Link Control (RLC) entity is activated;
   transmitting data on the uplink configured grant;
   receiving Hybrid Automatic Repeat reQuest (HARQ) information for the data; and
   entering a survival state and retransmitting data on the pre-allocated radio resource;
   wherein the pre-allocated radio resource is one or more uplink configured grants different from the uplink configured grant.

2. The method of claim 1, wherein the PDCP duplication is activated to retransmit the data if the data is not successfully transmitted on the uplink configured grant.

3. The method of claim 1, wherein the pre-allocated radio resource is at least one Radio Link Control (RLC) entity for the PDCP duplication.

4. The method of claim 1, wherein the PDCP duplication is triggered by Hybrid Automatic Repeat reQuest (HARQ) information.

5. The method of claim 4, wherein the activating the PDCP duplication comprises:
   activating the PDCP duplication if a negative acknowledgment (NACK) for the data on the uplink configured grant or a number of NACK for the data on the uplink configured grant is received.

6. The method of claim 5, wherein the number of NACK is configured based on a stringent degree of the UE.

7. The method of claim 1, wherein the PDCP duplication is triggered by duplication activation/deactivation Medium Access Control (MAC) Control Element (CE), or status reporting of RLC Protocol Data Unit (PDU), or PDCP status report.

8. A user equipment (UE), communicating with a base station (BS) in a network, the UE comprising:
   a memory, configured to store program instructions;
   a transceiver, configured to transmit and receive data; and a processor, coupled to the memory and the transmitter, configured to call and run the program instructions stored in a memory, to cooperate with the memory to execute the method of claim 1.

9. The method of claim 1, further comprising:

deactivating the PDCP duplication after receiving a certain number of positive acknowledgement (ACKs) for the data on the configured grant for the UE-based PDCP duplication.

10. The method of claim 9, further comprising:

transmitting an indication to the base station to notify the deactivation of the PDCP duplication.

11. A method of avoiding survival time (ST) failure, performed by a base station (BS) in a network, the method comprising:

configuring a user equipment (UE) with an uplink configured grant;

configuring the UE with pre-allocated radio resource;

configuring the UE with an enabler with boolean values indicating Packet Data Convergence Protocol (PDCP) duplication for retransmitting data on the pre-allocated radio resource associated with one or more Radio Link Control (RLC) entity is activated, wherein the UE is in radio resource control (RRC) connected state;

receiving data on the uplink configured grant from the UE;

transmitting a Hybrid Automatic Repeat reQuest (HARQ) information for the data to the UE;

dedicating the pre-allocated radio resource to the UE for receiving retransmitted data, from the UE, on the pre-allocated radio resource for PDCP duplication;

receiving retransmitted data on the pre-allocated radio resource from the UE, and wherein the pre-allocated radio resource is one or more uplink configured grants different from the uplink configured grant.

12. The method of claim 11, wherein the pre-allocated radio resource is dedicated to the UE for receiving the retransmitted data on the pre-allocated radio resource if the data is not successfully received by the base station.

13. The method of claim 11, wherein the pre-allocated radio resource is at least one Radio Link Control (RLC) entity for the PDCP duplication.

14. The method of claim 11, wherein the dedicating the pre-allocated radio resource to the UE comprises:

dedicating the pre-allocated radio resource including the PDCP duplication to the UE based on Hybrid Automatic Repeat reQuest (HARQ) information transmitted to the UE.

15. The method of claim 14, wherein the dedicating the pre-allocated radio resource to the UE comprises:

dedicating the pre-allocated radio resource including the PDCP duplication to the UE if a negative acknowledgment (NACK) for the data on the uplink configured grant or a number of NACK for the data on the uplink configured grant is transmitted to the UE.

16. A base station (BS), communicating with a user equipment (UE) in a network, the BS comprising:

a memory, configured to store program instructions;

a transceiver, configured to transmit and receive data; and a processor, coupled to the memory and the transmitter, configured to call and run the program instructions stored in a memory, to cooperate with the memory to execute the method of claim 11.

17. The method of claim 11, further comprising:

deactivating the PDCP duplication after transmitting a certain number of ACKs for the data on the configured grant for the PDCP duplication.

18. The method of claim 17, further comprising:

transmitting an indication to the UE to notify the deactivation of the PDCP duplication.

* * * * *